United States Patent Office 3,321,982
Patented May 30, 1967

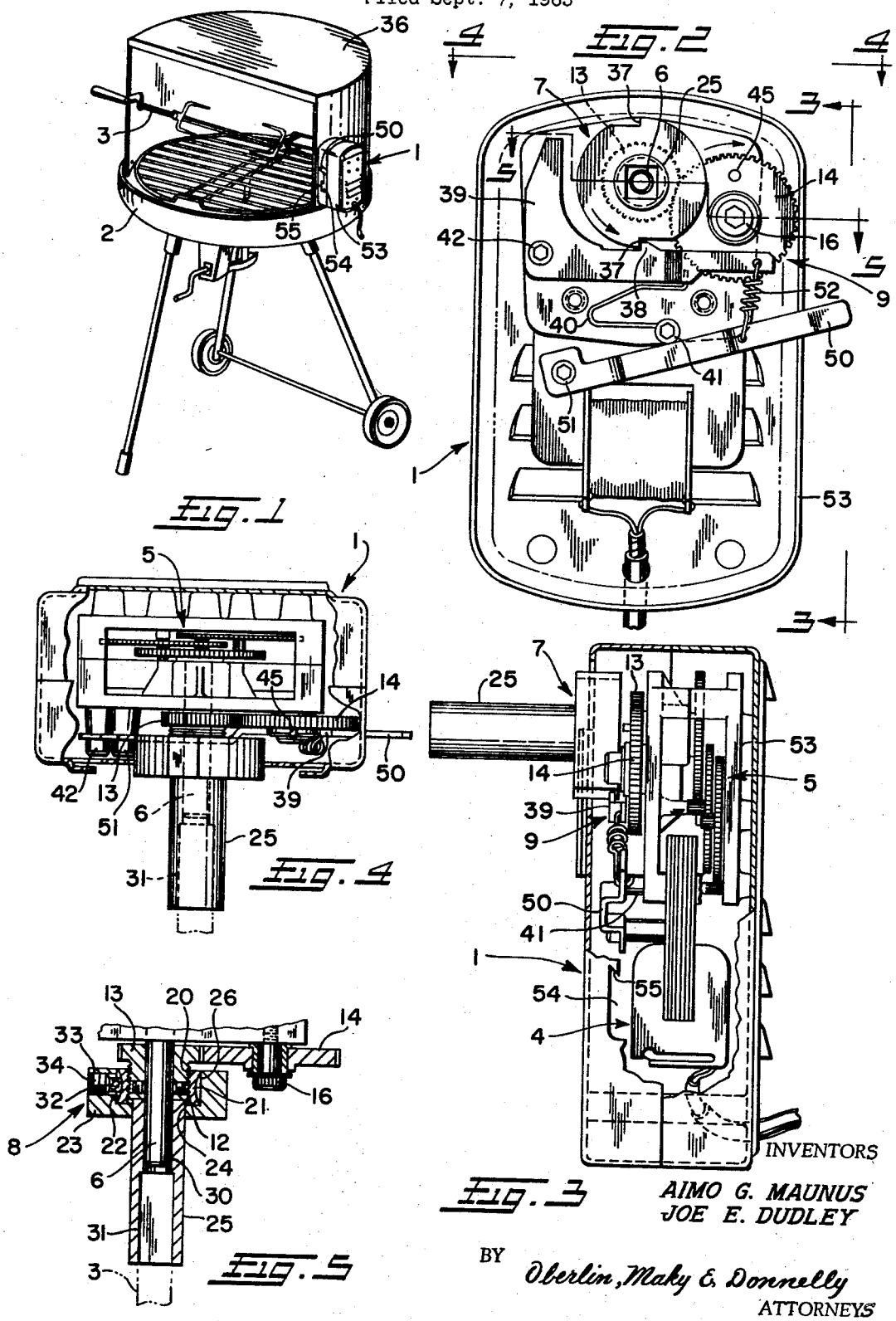

---

3,321,982
INTERMITTENT DRIVE MECHANISM
ESPECIALLY FOR ROTISSERIES
Aimo G. Maunus, 16 Townsend Ave., and Joe E. Dudley,
243 W. Main St., both of Norwalk, Ohio 44857
Filed Sept. 7, 1965, Ser. No. 485,342
7 Claims. (Cl. 74—84)

The present invention relates generally, as indicated, to an intermittent drive mechanism especially for rotisseries and, more particularly, to a drive mechanism for intermittently rotating a spit or the like on which food is mounted relative to a source of heat.

In the past, it has been the usual practice to charcoal, broil, or roast meat by impaling the meat on a spit and slowly rotating the same to achieve uniform cooking. This technique was often followed even for meat such as hamburgers, steaks, and chops, despite the fact that they could be more quickly cooked by intermittent turning. Moreover, in recent years it has been found that other types of meat, such as roasts and fowl, for example, can also be cooked very satisfactorily through intermittent rotation. However, intermittent rotating mechanisms are not in common use, primarily due to their high cost of manufacture.

It is therefore a principal object of this invention to provide an intermittent drive mechanism of the type described which is relatively simple in construction and inexpensive to make.

Another object is to provide such an intermittent drive mechanism with novel control means for selectively effecting continuous or intermittent rotation, as desired, including a friction clutch between the motor drive shaft and the coupling which receives the spit, and a catch mechanism which is adapted intermittently to engage and thus stop the coupling while permitting continued rotation of the drive shaft.

A further object is to provide an intermittent drive mechanism with novel control means of the type indicated, further including an idler gear which is driven by the output shaft and having a pin mounted thereon for intermittent engagement with the catch mechanism to move the same to an inoperative position to permit continued rotation of the coupling.

Yet another object is to provide such an intermittent drive mechanism with novel means for holding the lock mechanism in an inoperative position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a perspective view showing a preferred form of intermittent drive mechanism in accordance with the present invention mounted on an outdoor rotisseries of conventional type;

FIG. 2 is an enlarged front elevation of the intermittent drive mechanism as viewed from the left side of FIG. 1, with the front cover portion removed;

FIG. 3 is a side elevation of such intermittent drive mechanism as viewed from the plane of the line 3—3 of FIG. 2, with the side cover portion partially broken away;

FIG. 4 is a top plan view of the intermittent drive mechanism of FIG. 2 as viewed from the plane of the line 4—4, with the top cover portion partially broken away; and FIG. 5 is a fragmentary horizontal sectional taken on the plane of the line 5—5 of FIG. 2.

Turning now to the details of the invention, and first of all to FIG. 1, a preferred embodiment of intermittent drive mechanism is generally indicated at 1, it being shown mounted on a conventional rotisserie 2 such as is used outdoors for driving a spit 3. However, it should be understood that the intermittent drive mechanism 1 could just as readily be used inside to drive a spit in the oven or boiling chamber of a household or commercial range.

As previously indicated, most meats can be cooked quite satisfactorily by intermittent rotation of the spit, rather than continuous rotation thereof, and in some instances, it is more desirable to intermittently rotate the meat while cooking, but apparatus for effecting such intermittent rotation has heretofore not generally been available due to its high cost. The apparatus of the present invention, however, is capable of providing any type of intermittent motion desired, is quite simple in construction, and is relatively inexpensive to manufacture.

More specifically, the intermittent drive mechanism 1 comprises an electric motor or other prime mover 4 of any well known type including suitable reduction gearing 5 for effecting continuous rotation of the drive shaft 6 at a relatively slow rate of speed from say 4 to 8 r.p.pm.; a coupling 7 driven by the drive shaft 6 through a friction clutch 8; and control mechanism 9 for interrupting the rotation of the coupling 7 while the drive shaft 6 continues to rotate, as will be fully discussed hereafter.

Secured to the drive shaft 6 for rotation therewith as by means of one or more set screws 12 is a driving gear 13 which is in meshing engagement with an idler gear 14 rotatably mounted on the motor frame 15 by a shoulder screw 16 or the like. Thus, rotation of the drive shaft 6 also causes rotation of the idler gear 14, the speed of rotation of course depending upon the gear ratio between the driving gear 13 and idler gear 14, and the speed of rotation of the drive shaft 6. The function of the idler gear 14 which forms an important part of the control mechanism 9 will become apparent in the discussion which follows.

As perhaps best seen in FIG. 5, the driving gear 13 has a projecting hub portion 20 on which there is threadedly received a coupling nut 21 having an outer concave surface 22. Surrounding the nut 21 is a coupling collar 23, it having a bore 24 therein for receipt of a tubular extension 25, and a counterbore 26 the diameter of which is slightly greater than the diameter of the nut 21, whereby the collar 23 of the coupling 7 may be rotated relative to the nut 21 and drive shaft 6. The tubular extension 25 is brazed or otherwise secured to the wall of the bore 24, and has a central opening 30 at one end into which the end of the drive shaft 6 extends and a socket 31 at the other end for receipt of the end of the spit 3.

For effecting rotation of the coupling 7 and spit 3 upon rotation of the drive shaft 6, the friction clutch 8 is provided, it preferably including a fiber plug 32 disposed in a radial opening 33 in the collar 23 in line with the concave surface 22 in the nut 21, and a set screw 34 threadably received in the radial opening 33 and in engagement with the fiber plug.

Upon tightening of the set screw 34, the fiber plug 32 is forced into tight frictional engagement with the concave surface 22 of the nut 21 to establish a friction drive between the collar 23 and nut 21. As apparent, the amount of friction established between these two parts depends upon the extent to which the set screw 34 is tightened and the material of the fiber plug. Through this friction clutch 8, the intermittent drive mechanism 1, when suitably attached to the rotisserie cover 36 with the end of the spit 3 inserted in the socket 31 as shown in FIG. 1, drives the spit 3 at a uniform rate of speed.

The collar 23 is further provided with a plurality of notches 37 in the outer surface thereof which are adapted to be engaged by a projection 38 on the catch lever 39 of the control mechanism 9 when the catch lever 39 is held in engagement with the collar 23, as by means of a hair pin spring 40, one end of which is secured to the motor frame 15 by a suitable fastener 41, and the other end of which engages the catch lever 39 tending to cause it to rotate about its pivot 42 toward the collar 23. With the projection 38 in engagement with one of the notches 37, the collar 23 and spit 3 are precluded from rotating, but not the drive shaft 6, since the friction clutch 8 merely creates a gripping force sufficient to transmit torque between the drive shaft 6 and coupling 7 when there is a slight resistance to turning such as might be caused by a large roast, and not sufficient to stall the motor 4.

In addition to the catch lever 39, the control mechanism 9 includes the idler gear 14 as aforesaid, from which there projects a pin 45. The pin 45 is on a radius which will cause it to engage the catch lever 39 once for every revolution of the idler gear 14 and, during such engagement, move the catch lever 39 to a position releasing the collar 23. When this occurs, the collar 23 is rotated by the drive shaft 6 through the friction clutch 8 and will continue to rotate until the next notch 37 is engaged by the catch lever 39, which is promptly moved back into contact with the outer surface of the collar 23 by the spring 40 as soon as the pin 45 clears such catch lever.

In the preferred form, the idler gear 14 completes one revolution every thirty seconds. Accordingly, if two oppositely disposed notches 37 are provided in the collar 23 as shown in FIG. 2, the coupling 7 and thus the spit 3 will be permitted to rotate intermittently 180° approximately every thirty seconds, and if the drive shaft 6 is being driven at say 6 r.p.m., then each 180° of rotation will take approximately five seconds. Although 180° intermittent rotation is desirable in this case, it should be apparent that the amount of step by step rotation can be varied without departing from the present invention simply by varying the number and location of notches 37. Also, the length of time that the spit 3 is held stationary can be varied by changing the speed at which the idler gear 14 is driven, or by adding more pins 45.

On occasion, it may be desirable continuously to rotate the spit 3, rather than intermittently rotate the same. In order to be able to do this with the present apparatus, the control mechanism 9 is further provided with an operating handle 50 pivotally mounted to the motor frame 15 at 51 and there is a spring 52 or like connection between the catch lever 39 and handle 50. Accordingly, when the operating handle 50 is moved downwardly, the catch lever 39 is likewise moved downwardly to an inoperative position out of contact with the outer surface of the collar 23. Of course, the spring 52 must be stronger than the spring 40 or otherwise movement of the handle 50 will not cause the desired movement of the catch lever 39. If preferred, a rigid connection between the catch lever 39 and handle 50 may be used in place of the spring 52.

For retaining the operating handle 50 in either the operative position shown in FIG. 2 whereat the catch lever 39 is in engagement with the collar 23 or in the inoperative position discussed above, the cover 53 for the intermittent control mechanism 1 is provided with a vertically extending slot 54 through which the handle 50 extends and a pair of vertically spaced notches 55 into which the operating handle 50 may be moved. The spring 40 tending to cause upward movement of the catch lever 39 and the spring 52 between the catch lever 39 and handle 50 cooperate to hold the operating handle 50 in the selected notch.

From the above discussion, it should now be apparent that the intermittent drive mechanism of the present invention is simple in construction, and can easily be adapted to effect any degree of intermittent rotation of a spit which may be desired. Moreover, the time interval between movements can be controlled, and the mechanism can even be adjusted to cause continuous rotation.

Other modes of applying the principles of the invention may be employed, change being made as regards the details described, provided the features stated in any of the following claims or the equivalent of such be employed.

We therefore, particularly point out and distinctly claim as our invention:

1. A drive mechanism comprising a drive shaft, means for effecting continuous rotation of said drive shaft, a coupling, means mounting said coupling on said drive shaft for transmission of a predetermined amount of torque from said drive shaft to said coupling, and means for applying a torque load to said coupling greater than such predetermined amount of transmitted torque to cause said coupling to stop while permitting continued rotation of said drive shaft, said coupling including a collar, and said means for transmitting torque from said drive shaft to said coupling comprising a bushing fixed to said drive shaft, a nut threadably received on said bushing and having a concave outer peripheral surface, said nut being loosely received within a recess in said collar, a radial opening in said collar in radial alignment with said concave surface on said nut, a fiber plug dispsoed in said radial opening, and a set screw threadably received in said radial opening and in engagement with said fiber plug, whereby upon tightening of said set screw, said fiber plug is forced into tight frictional contact with said nut to establish a friction drive between said collar and nut.

2. An intermitten drive mechanism comprising a drive shaft, motor means for effecting continuous rotation of said drive shaft, a driving gear mounted on said drive shaft for rotation therewith, an idler gear in meshing engagement with said driving gear to be driven thereby, said driving gear having a hub portion, a nut threadably engaging said hub portion, a collar loosely received about said nut, friction drive means disposed between that portion of said collar surrounding said nut and the adjacent nut surafec for frictionally interconnecting said collar and said nut, said collar having a plurality of notches in the outer surface thereof, at catch lever pivotally mounted to the frame of said motor, spring means for urging said catch lever into engagement with the outer surface of said coupling, said catch lever having a projection thereon which is adapted to engage one or the other of said notches on said collar to overcome the friction drive between said collar and nut to stop rotation of said collar, and a pin means on said idler gear which engages said catch lever once every revolution of said idler gear to move said catch lever to an inoperative position whereat said projection is disengaged from said notches and said collar is permitted to rotate, said spring means promptly returning said catch lever into contact with said collar once said pin means clears said catch lever.

3. An intermittent drive mechanism for intermittently driving the spit of a rotisserie or the like comprising a drive shaft, means for causing said drive shaft to rotate at a uniform rate of speed, a coupling slidably received on said drive shaft, said coupling having a socket for receipt of the end of a spit, means establishing a friction drive between said coupling and said drive shaft, a catch lever, spring means urging said catch lever into engagement with the outer surface of said coupling, stop means carried by said coupling and catch lever to halt rotation of said coupling when said stop means are in engagement with each other, and means for intermittently moving said catch lever to an inoperative position whereat said stop means are disengaged and said coupling is permitted to be rotated by said drive shaft through said friction drive means, said coupling including a collar, and said means for establishing a friction drive between said coupling and drive shaft comprising a hub portion projecting from said driving gear, a nut threadably received on said hub portion and having a concave outer peripheral surface, said nut being loosely received within a recess in said collar, a radial opening in said collar in radial alignment with said concave surface on said nut, a fiber plug disposed in said radial opening, and a set screw threadably received in said radial opening in engagement with said fiber plug, whereby upon tightening of said set screw, said fiber plug is forced into tight frictional contact with said nut to establish a friction drive between said collar and nut.

4. An intermitten drive mechanism for intermittently driving the spit of a rotisserie or the like comprising a drive shaft, means for causing said drive shaft to rotate at a uniform rate of speed, a coupling slidably received on said drive shaft, said coupling having a socket for receipt of the end of a spit, means establishing a friction drive between said coupling and said drive shaft, a catch lever, spring means urging said catch lever into engagement with the outer surface of said coupling, stop means carried by said coupling and catch lever to halt rotation of said coupling when said stop means are in engagement with each other, means for intermittently moving said catch lever to an inoperative position whereat said stop means are disengaged and said coupling is permitted to be rotated by said drive shaft through said friction drive means, and means for selectively holding said catch lever in such inoperative position out of contact with said coupling, said last-mentioned means comprising a pivotally mounted operating handle, and a second spring means interconnecting said catch lever and operating handle, said second spring means being stronger than said first spring means, thereby movement of said operating handle away from said coupling causes a corresponding movement of said catch lever.

5. The intermitten drive mechanism of claim 4 wherein there is a cover surrounding said mechanism, and said means for selectively holding said catch lever in such inoperative position further comprises a vertical slot in said cover through which said handle extends, and a pair of vertically spaced notches in the wall of said slot into which said handle is adapted to be moved for retaining said catch lever in either the operative or inoperative position.

6. An intermitten drive mechanism comprising a drive shaft, motor means for effecting continuous rotation of said drive shaft, a driving gear mounted on said drive shaft for rotation therewith, an idler gear in meshing engagement with said driving gear to be driven thereby, said driving gear having a hub portion, a nut threadably engaging said hub portion, a collar loosely received about said nut, friction drive means interconnecting said collar and said nut, said collar having a plurality of notches in the outer surface thereof, a catch lever pivotally mounted to the frame of said motor, spring means for urging said catch lever into engagement with the outer surface of said coupling, said catch lever having a projection thereon which is adapted to engage one or the other of said notches on said collar to overcome the friction drive between said collar and nut to stop rotation of said collar, a pin means on said idler gear which engages said catch lever once every revolution of said idler gear to move said catch lever to an inoperative position whereat said projection is disengaged from said notches and said collar is permitted to rotate, said spring means promptly returning said catch lever into contact with said collar once said pin means clears said catch lever, an operating handle pivotally mounted to said motor frame, and a second spring means interconnecting said catch lever and operating handle, said second spring means being stronger than said first spring means, whereby movement of said operating handle away from said coupling causes a corresponding movement of said catch lever.

7. An intermittent drive mechanism for intermittently driving the spit of a rotisserie or the like comprising a drive shaft, means for causing said drive shaft to rotate at a uniform rate of speed, a coupling slidably received on said drive shaft, said coupling having a socket for receipt of the end of a spit, means establishing a friction drive between said coupling and said drive shaft, a catch lever, spring means urging said catch lever into engagement with the outer surface of said coupling, stop means carried by said coupling and catch lever to halt rotation of said coupling when said stop means are in engagement with each other, means for intermittently moving said catch lever to an inoperative position whereat said stop means are disengaged and said coupling is permitted to be rotated by said drive shaft through said friction drive means, said means for intermittently moving said catch lever to an inoperative position comprising a driving gear mounted on said drive shaft for rotation therewith, an idler gear in meshing engagement with said driving gear to be driven thereby, and a pin means on said idler gear operative to directly engage said catch lever once every revolution of said idler gear to move said catch lever to such inoperative position, said spring means promptly returning said catch lever into contact with said coupling after said pin means clears said catch lever.

References Cited

UNITED STATES PATENTS

| | | | |
|---|---|---|---|
| 255,196 | 3/1882 | Ross | 64—30 |
| 1,426,344 | 8/1922 | Bennett | 74—125.5 X |
| 2,183,361 | 12/1939 | Swanson | 74—125.5 |
| 2,209,858 | 7/1940 | Steiert | 74—112 |
| 2,627,945 | 2/1953 | Hooker | 74—819 |

FOREIGN PATENTS 717,743   2/1942   Germany.

MILTON KAUFMAN, *Primary Examiner.*

FRED C. MATTERN, *Examiner.*

D. H. THIEL, *Assistant Examiner.*